(12) United States Patent
Woodard et al.

(10) Patent No.: US 6,884,039 B2
(45) Date of Patent: *Apr. 26, 2005

(54) FLYWHEEL SYSTEM WITH PARALLEL PUMPING ARRANGEMENT

(75) Inventors: Nathan G. Woodard, Pasedena, CA (US); Jeremiah I. Rathbun, Peabody, MA (US); Paul E. Dresens, Wayland, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/334,514

(22) Filed: Dec. 30, 2002

(65) Prior Publication Data

US 2003/0175126 A1 Sep. 18, 2003

Related U.S. Application Data

(63) Continuation-in-part of application No. PCT/US01/20627, filed on Jun. 28, 2001, which is a continuation-in-part of application No. 09/606,724, filed on Jun. 29, 2000, now Pat. No. 6,347,925.

(51) Int. Cl.[7] ............................. F04B 37/02; G05G 3/00
(52) U.S. Cl. ........................................... 417/51; 74/572
(58) Field of Search ............................... 417/51, 199.1; 74/572; 310/74

(56) References Cited

U.S. PATENT DOCUMENTS

| | | | |
|---|---|---|---|
| 4,223,240 A | 9/1980 | Theyse | |
| 5,203,889 A | * 4/1993 | Brown | 96/115 |
| 5,462,402 A | 10/1995 | Bakholdin et al. | |
| 5,614,777 A | * 3/1997 | Bitterly et al. | 310/74 |
| 5,767,595 A | 6/1998 | Rosen | |
| 6,144,128 A | 11/2000 | Rosen | |
| 6,150,742 A | * 11/2000 | Horner et al. | 310/74 |
| 6,175,172 B1 | 1/2001 | Bakholdin et al. | |
| 6,241,477 B1 | 6/2001 | Brezoczky et al. | |
| 6,347,925 B1 | * 2/2002 | Woodard et al. | 417/51 |
| 6,585,490 B1 | * 7/2003 | Gabrys et al. | 417/51 |

* cited by examiner

*Primary Examiner*—Charles G. Freay
(74) *Attorney, Agent, or Firm*—David G. Conlin; William J. Daley, Jr.; Edwards & Angell, LLP

(57) ABSTRACT

A flywheel energy storage system, including a plurality of pumps arranged in parallel for simultaneously drawing-off and absorbing substantially all of the gases that evolve from a flywheel assembly during high-speed operation, is disclosed. The plurality of pumps includes at least one pump for pumping mainly water vapor; and, at least one pump for pumping mainly active gases. The at least one pump for pumping mainly water vapor plurality of pumps is disposed in a gas storage chamber that is separate from the main housing of the flywheel system. The at least one pump for pumping mainly active gases is disposed in a container external to the main housing and fluidly coupled to the gas storage chamber. A drag pump assists the plurality of pumps in the gas storage chamber by pumping the evolved gases from the main housing to the gas storage chamber.

19 Claims, 6 Drawing Sheets

FLYWHEEL SYSTEM WITH PARALLEL PUMPING ARRANGEMENT

This is a continuation-in-part of PCT application PCT/US01/20627, filed Jun. 28, 2001, which is a continuation-in-part of U.S. application Ser. No. 09/606,724, filed Jun. 29, 2000, now U.S. Pat. No. 6,347,925, all of the teachings of which are incorporated herein by reference.

BACKGROUND OF THE INVENTION

1. Field of the Invention

This invention relates generally to flywheel energy storage systems, and more particularly to a flywheel energy storage system that includes a high-speed flywheel assembly, and a plurality of pumps arranged in parallel for reducing windage losses due to gases contained in or evolving from the high-speed flywheel assembly and other portions of the flywheel system.

2. Background

FIG. 1 shows a simplified view of a conventional flywheel energy storage system 100 used for storing kinetic energy. The conventional flywheel system 100 includes a flywheel assembly 104 disposed in a flywheel housing 102. Further, a drag pump 106 is incorporated into the flywheel assembly 104 for pumping gases from the flywheel housing 102 into a separate gas storage chamber 108. For example, FIG. 1 includes arrows for indicating a direction of gas flow from the flywheel housing 102, through helical grooves (not numbered) formed in the drag pump 106, and then into the gas storage chamber 108.

Traditionally, flywheel assemblies have been made of metal, e.g., high strength steel. More recently, flywheel assemblies have been fabricated using fiber composite materials, e.g., fiberglass or carbon fibers wound with a resin binder, thereby making flywheel assemblies that are lighter in weight and capable of operating at higher speeds than the traditional metal flywheel assemblies operate. Both the flywheel assemblies that are made of metal and those made of fiber composite materials typically evolve substantial quantities of gases during operation, thereby potentially increasing gas pressure levels inside flywheel housings to unacceptable levels. Such increased pressures can significantly reduce the useful lifetime of flywheel energy storage systems because they generally lead to high windage losses.

For this reason, pumps like the drag pump 106 shown in FIG. 1 have been used for drawing off evolved gases from flywheel housings. Pumps suitable for this purpose include both turbo-molecular pumps and molecular drag pumps. However, such pumps have drawbacks in that they are typically not designed for pumping evolved gases directly from flywheel housings to the atmosphere.

A common solution to this problem is to provide a mechanical roughing pump at the outlet of a drag pump in a flywheel system. Such mechanical roughing pumps are generally capable of exhausting directly to the atmosphere. As a result, the drag pump and the roughing pump may be used in combination for drawing off the evolved gases in the flywheel housing, thereby reducing gas pressure levels in the flywheel housing for optimal flywheel operation. However, mechanical roughing pumps also have drawbacks, in that they are usually high in cost and typically require frequent maintenance.

Another solution is to provide a gas storage chamber such as the chamber 108 (see FIG. 1) at the outlet of the drag pump. For example, in U.S. Pat. No. 5,462,402 ("the '402 patent") issued Oct. 31, 1995, to Bakholdin et al., a flywheel energy storage system with an integral molecular pump is disclosed. In accordance with that disclosure, a flywheel assembly used for mobile energy storage incorporates a molecular pump and an internal chamber containing molecular sieves. The molecular pump shares the shaft, bearings, and motor of the flywheel rotor, and maintains the high vacuum desired in the vicinity of the flywheel rotor. The gases, which evolve from all parts within the flywheel system during its operational life, are pumped into the chamber containing molecular sieves, where they are adsorbed.

However, the flywheel energy storage system described in the '402 patent also has some drawbacks. For example, the molecular sieves contained in the internal chamber typically cannot adsorb all of the different types of gases that can evolve during high-speed operation of the flywheel assembly.

Specifically, the evolved gases may include water vapor along with various quantities of hydrocarbons and/or other active gases such as hydrogen or nitrogen. As used herein "active gases" means gases other than water vapor and inert gases. Although molecular sieves can, in general, efficiently adsorb, e.g., water vapor, they typically cannot adsorb substantial quantities of hydrocarbons and/or other active gases, especially at temperatures of about 20° C. and above. This is a significant problem because flywheel assemblies operating at high-speed, especially those made of fiber composite materials, are likely to evolve substantial quantities of active gases. If these gases are not adsorbed by the molecular sieves or otherwise pumped out to the atmosphere, the flywheel system, e.g., the flywheel housing and/or the above-described internal chamber, will likely be subjected to unacceptable gas pressure levels over time, thereby increasing windage losses and significantly limiting the useful lifetime of the flywheel system.

Further, in accordance with the disclosure of the '402 patent, getter materials may be disposed throughout the vacuum housing of the flywheel to absorb trace quantities of gases that are not readily adsorbed by the molecular sieves contained in the internal chamber of the flywheel system.

However, this approach also has some drawbacks. Specifically, as the getter material disposed in the flywheel housing increasingly absorbs the trace quantities of gases, its capacity for further absorbing gases typically degrades. Getter pumps designed for use in flywheel systems typically have limited pumping capacities. As a result, gas pressure surrounding the getter material in the flywheel housing can increase over time, thereby increasing overall gas pressure in the flywheel housing to unacceptable levels.

One way of achieving increased pumping capacity in flywheel systems is to use non-evaporable getter (NEG) pumps, which generally have pumping capacities that are significantly greater than that of evaporated getter pumps. Such NEG pumps typically achieve a maximum capacity for pumping various gases at elevated temperatures, e.g., 250° C. or higher. For example, in U.S. Pat. No. 5,879,134 ("'134") issued Mar. 9, 1999, to Lorimer et al., a getter pump for pumping gases in a wafer processing system is disclosed. In accordance with that disclosure, a wafer processing system includes a processing chamber, a low-pressure pump coupled to the processing chamber for pumping gases, a valve mechanism coupling a source of inert gas to the processing chamber, an in situ getter pump disposed within the processing chamber which pumps certain active gases during the flow of the inert gas into the chamber, and a processing mechanism for processing a wafer disposed within the processing chamber. Preferably, the in situ getter pump can be operated at a number of different temperatures to preferentially pump different species of gas at those temperatures. A gas analyzer is used to automatically control the temperature of the getter pump to control the species of gases that are pumped from the chamber.

However, systems incorporating the getter pumps for pumping gases as described in the '134 patent typically consume significant amounts of power. Although high power consumption might be acceptable in systems such as wafer processing systems, it is generally unacceptable in flywheel energy storage systems.

In addition, as explained above, gases that evolve from flywheel systems typically include water vapor along with lesser quantities of hydrocarbons and/or other active gases. Further, the getter material disposed in the flywheel housing is usually capable of absorbing all of these evolved gases inside the housing, thereby rapidly and significantly degrading the capacity of the getter material for further absorbing gases. This not only causes gas pressure levels of the evolved gases to increase over time, but also significantly increases costs because such getter materials used with flywheel systems are relatively expensive.

Restricting gas flow to the getter material can significantly reduce the speed at which the getter material degrades, thereby reducing the cost of using the getter material. For example, in U.S. Pat. No. 4,272,259 ("the '259 patent") issued Jun. 9, 1981, to Patterson et al., a gas gettering system is disclosed. In accordance with that disclosure, a fluid-tight container holding active getter and non-sorbable gas at a pressure of at least about one atmosphere is provided, with gas flow passage means through a wall of the container providing communication between the active getter and the container-surrounding environment and removable closure means for the gas flow passage means. The container may be opened for gas flow communication and exposure of the active getter prior to sealing of a vacuum enclosure in which it is installed, without significant loss or impairment of sorptive capacity of the getter.

However, the gas gettering system described in the '259 patent also has some drawbacks. For example, restricting gas flow to the getter material not only reduces the speed at which the getter material degrades, but also reduces the speed at which the getter material pumps gases. This can be problematic in flywheel systems because if the evolved gases are not pumped out of the flywheel housing at a fast enough rate, gas pressure levels inside the flywheel housing will likely rise to unacceptable levels, thereby increasing windage losses and reducing the useful lifetime of the flywheel system.

Providing a plurality of getter materials can also reduce the speed at which getter materials degrade, thereby reducing costs. For example, in U.S. Pat. No. 4,297,082 ("the '082 patent") issued Oct. 27, 1981, to Wurtz et al., a vacuum gettering arrangement is disclosed. In accordance with that disclosure, the vacuum gettering system includes first bulk getter of zirconium-aluminum alloy and having a heater therein for activation. Second bulk getter of porous silica glass is directly adjacent to the first bulk getter for heating activation. As the vacuum enclosure is pumped out, the heater heats both getters to activation temperature to drive off gases and vapors during low temperature enclosure baking and pump-out so that at enclosure close-off both getters are fully activated.

Again, the vacuum gettering arrangement described in the '082 patent has some drawbacks. For example, that vacuum gettering system includes a heater for heating both the first bulk getter and the second bulk getter to activation temperature. As explained above, such getter pumps that require heat activation often consume significant amounts of power, which is generally unacceptable in flywheel energy storage systems.

Further, the '082 patent discloses that the first bulk getter of zirconium-aluminum alloy is principally for light gas absorption, while the second bulk getter of porous silica glass is principally for water absorption. However, even though the first and second bulk getter materials are meant to be used for absorbing specific types of gases, in practice getter materials are frequently capable of absorbing different types of gases, including water vapor. As a result, the relatively expensive getter material used for absorbing trace gases might still be quickly degraded by absorbing substantial quantities of, e.g., water vapor, along with the trace gases. Such a gettering arrangement would be unsuitable for use in low-power, low-cost, flywheel energy storage systems.

It would therefore be desirable to have a flywheel energy storage system that has lower windage losses and a longer useful life than conventional flywheel energy storage systems. Such a flywheel energy storage system would be capable of successfully drawing off gases that typically evolve from a flywheel system during operation, thereby creating a near-vacuum in the flywheel housing for optimal flywheel operation. It would also be desirable to have such vacuum pumping in a low-power, low-cost, flywheel energy storage system.

SUMMARY OF THE INVENTION

The present invention provides a flywheel energy storage system that includes a parallel-pumping arrangement situated in a gas storage chamber separate from the main flywheel housing, for drawing off substantially all of the gases that evolve from the flywheel during high-speed operation. Advantageously, the flywheel energy storage system provides reduced windage losses, is lower in cost, has lower power requirements, and has a longer life than conventional flywheel energy storage systems.

According to one embodiment of the present invention, a flywheel energy storage system includes a sealed housing; a flywheel assembly disposed within the sealed housing; a gas storage chamber disposed within the sealed housing; a first pump disposed within the sealed housing and operatively coupled to the gas storage chamber for pumping gases that evolve from the flywheel assembly and other portions of the flywheel system into the gas storage chamber, the evolved gases including water vapor and active gases; and, a plurality of pumps disposed in the gas storage chamber for simultaneously pumping substantially all of the gases pumped into the gas storage chamber, wherein the plurality of pumps includes at least one pump for pumping mainly the water vapor and at least one pump for pumping mainly the active gases.

According to one feature of the above-described flywheel energy storage system, the pump for pumping mainly the water vapor is a water sorbent, and the pump for pumping mainly the active gases is a getter pump. Further, the water sorbent is preferably calcium oxide; and, the getter pump preferably includes non-evaporable getter (NEG) material.

According to another embodiment of the present invention, a method of reducing gas pressure within a flywheel housing includes the steps of pumping evolved gases from the flywheel housing to a chamber separate from the flywheel housing; and, simultaneously pumping substantially all of the gases pumped into the separate chamber using a plurality of pumps disposed within the separate chamber, the plurality of pumps including at least one pump for pumping mainly water vapor and at least one pump for pumping mainly active gases.

According to still another embodiment of the present invention, a method of reducing gas pressure within a flywheel housing includes the steps of pumping evolved gases from the flywheel housing to a chamber separate from the flywheel housing; continuously pumping evolved water vapor by using at least one first pump disposed in the separate chamber; and, intermittently pumping evolved active gases using at least one second pump disposed in the separate chamber, the at least one second pump intermittently pumping the active gases at times when associated active gas loads approach predetermined levels.

According to still another embodiment of the present invention, an apparatus for simultaneously pumping a plurality of different types of gases includes a water sorbent; and, a getter pump, wherein the getter pump includes a getter housing with a constricted inlet, and a getter material storage chamber disposed within the getter housing, the storage chamber having getter material disposed therein, the getter material being in fluid communication with the constricted inlet.

According to one feature of the above-described pumping apparatus, the pumping speed of the getter pump is substantially reduced relative to the pumping speed of the water sorbent. This allows the water sorbent to absorb substantially all water vapor that might be surrounding the pumping apparatus, while allowing the getter pump to absorb active gases that might also surround the pumping apparatus, and a relatively small amount water vapor which may be missed by the water sorbent. Preferably, the water sorbent has a relatively high capacity for water vapor sorption, but little or essentially no capacity for sorption of other active gases, typically, the materials emitted or evolved from the flywheel system contain far more water vapor than other gaseous materials. When the system is arranged so that the getter pump has a reduced pumping speed, compared to the pumping speed of the water sorbent, the ability of the getter material used with the getter pump to remove the active gases degrades over a longer period of time. As a result, the flywheel energy storage system of the present invention has a lifetime that significantly exceeds that of conventional flywheel energy storage systems. Moreover, the getter materials used to absorb the smaller amounts of non-water gaseous materials are far more expensive than the water sorbents. Therefore, suitable arrangement of the amounts and pumping speeds of the sorbent systems permits substantially increased pumping efficiency, useful flywheel life and substantially reduced cost.

There are several ways in which to arrange the system so that the pumping speed of the getter pump is reduced compared to the pumping speed of the water sorbent material.

The easiest way to reduce water absorption by the getter pump is to constrict the inlet of the getter pump while simultaneously maximizing access to the desiccant; this results in a higher fraction of water molecules getting absorbed by the desiccant before they reach the getters. By constricting the inlet or access to the getter pump, the chances that water molecules will reach the getters before they reach the desiccant are reduced.

Restricting access to the getter pump results in an increase in the total pressure of active gases (gases such as hydrogen and nitrogen, which are not pumped by the desiccant), in direct proportion to the extent of the restriction. The more the access to the getter pump is restricted, the higher the pressure of active gas. In the preferred system of the present invention, however, the increased pressure can be offset by the presence of an integral drag pump, which provides substantially lower pressure in the flywheel area while permitting higher pressure in the gas storage area. Thus restriction of the access to the getter pump can be used even though it increases total pressure of active gases in the gas storage area. The increased pressure can be tolerated as long as it is within limits allowed by the performance of the drag pump. For example, where the gas load of hydrogen relative to water vapor is approximately $\frac{1}{100}$, the technique works well.

Assuming that appropriate measures are taken concerning cleanliness and material choices, a typical unit may have a $H_2O$ gas load(Q) of about 1E-3 torr liters per second. Preferably CaO is initialized to provide an equlibrium vapor pressure (P) of about 0.030 torr. The amount of CaO may vary, typically between about 0.5 and 1 pound depending on granularity and porosity of the available CaO product. This indicates a pumping speed S, given by S=Q/P, of about 0.03 liters per second. To achieve decent parallel pumping the conductance limited pumping speed of the getter pump can be 0.001 to 0.01 liter/second or less. If the active gas load is about 1E-5 torr liters per second, the equilibrium active gas pressure will be about 0.01 torr. A pumping speed of 0.003 l/s can be achieved by constricting the getter pump with a tube 3 cm long and 0.6 mm in diameter.

| Term: | Definitions: |
|---|---|
| SD | Pumping speed of desiccant at equilibrium (steady state) |
| SP | Pumping speed of getter pump |
| QH20 | Water vapor gas load |
| QA | Active gas load |
| C | Drag pump compression ratio |
| SDRAG | Drag pump pumping speed |

In general, the system is set up and run so that the relative effective pumping speed of the getter pump is about 0.1 to 50%, preferably about 1 to about 20%, most preferably about 1% of the pumping speed of the desiccant. Preferably, the pumping speed of the getter pump is adjusted by intermittent heating and passivation of the getter material. The speed can also be effected by constriction of the access to the getter pump. For example, the getter pump aperture can be designed or adjusted so that SP=SD/10. This can be done either with an aperture or a thin tube. In the normal case, water vapor is the dominant gas load in the system. The system works as long as all of the following conditions are satisfied.

$$QA/(SP*C) \leq 1 \times E^{-4} \text{ torr} \quad (1)$$

$$QH20/(SD*C) \leq 1 \times E^{-4} \text{ torr} \quad (2)$$

$$QH20/SDRAG \leq 1 \times E^{-4} \text{ torr} \quad (3)$$

Another method of restricting the relative effective speed of the getter pump with respect to the water sorbent is to control the activation of the getter pump. For example, in our preffered embodiment, the getter material consists of non-evaporable getter (NEG) "pills"; we will refer to this specific case as a "pill pump." This is because NEG material is commonly available in the form of pills. NEG Pills pumps are coated with a "passivation layer" before shipping. The bulk getter material is coated with active gases by controlled exposure to the active gases. In that state, further exposure to active gases hardly effects the pills, and the pills absorb no molecules.

In order to act as getter pumps the pills need to be heat activated while under vacuum. This is accomplished by heating the pills to at least 200° C. for at least a few hours (typically more). Preferably the pills are activated at a temperature which is somewhat hotter than the temperature at which the pill pump is run. Thus, for NEG pills, which are typically run at about 300° C., the activation temperature should be about 350° C. to about 450° C., preferably at about 400° C.

During activation the initial passive layer diffuses into the bulk where it is absorbed along with any gases "pumped" by the pill during it's heated state. If the heater is de-activated and the pills are allowed to cool to room temperature, they continue to pump gases from within the vacuum chamber for a period of time. Since the getter pills are no longer heated, these gases do not diffuse deeply into the bulk getter material. As the getter pills pick up the gases, they are slowly passivated until pumping action stops completely. Depending on the passivation gas, a one gram getter pill at room temperature may typically be completely passivated after absorbing somewhere between 0.03 and 0.1 torr liters of gas. The same pills in the heated state absorb more than 10 torr liters of most active gases, and up to 100 torr liters of hydrogen—so their potential pumping capacity is about 100 times the amount of gas needed for passivation.

Preferably, the above properties are utilized to essentially turn the pill pump on and off—when the pump is hot it is "on" and pumping, and when it is cool it gets passivated and is hence turned "off".

An advantageous point of the parallel pumping achieved by the present invention is to limit the amount of water vapor absorbed by the relatively expensive getter (preferably NEG pills). One way to achieve this is to minimize the amount of time during which the pill pump is "on"; the pill pump only absorbs significant quantities of water vapor, or any other gas, when it is hot. When cold, the pills absorb minimal material until their cold capacity is exhausted.

Thus, in the case of a NEG pill pump, the getter pumping rate can be substantially reduced by heating the pills only intermittently. In effect, by controlling the periods during which heat is applied to the pill pump, the water vapor which is the main evolved material will almost exclusively be absorbed by the dessicant material.

In a typical case, the pill pump may be run for one day every 10 to 50 weeks. While the pill pump is off, water vapor is continuously pumped and chemically "trapped" by the water sorbent (e.g., CaO). During that time, the pressure of other gases present in the system slowly builds up. Because the pressure in the flywheel chamber is being maintained at $1 \times E^{-4}$ torr pressure using a drag pump with a compression ratio of 1000, the active gas (non-water vapor) pressure can be allowed to build up to 0.1 torr before activating the pill pump. Depending on the system involved, that can take from days to many weeks. Preferably, the pill pump will be activated long before the pressure actually reaches 0.1 torr. The timing of the periodic activations of the pill pump can be done by observing the total gas pressure of the gas collection zone, and/or observing the pressure of the flywheel zone. Further, measurement of the drag resistance of the flywheel can indicate a need for further evacuation of the flywheel chamber, which may be caused by back pressure building up from the accumulation of active gases in the gas collection zone. Alternatively, the pill pump can be activated at particular intervals, depending on the expected rate of active gas buildup.

In another aspect of this invention, the intermittent activation of the pill pump is improved by grinding the bulk NEG material to have an optimum surface to volume ratio. Although the intermittent activation of the pill pump is effective to reduce water sorption by the pills, a portion of the capacity of the NEG material is somewhat reduced by water passivation during the cool-down of the pill pump.

Since water is the dominant gas load in the system, each time the pill pump is turned off it is coated (passivated) primarily by water. A one gram pill of st707 will absorb up to 0.07 torr liters of water, or about 0.4% of it's capacity, each time it is cycled. Thus each time the pill is passivated, there is a loss of 0.4% of the pills capacity to pump a non-water active gas.

This lost getter capacity can be substantially reduced by adjusting the surface to volume ratio of the pills. NEG materials sold for vacuum applications, such as SAES st707 pills, are normally produced intentionally with very high surface to volume ratios. See, e.g., U.S. Pat. No. 6,027,986, issued to Conte, et al., on Feb. 22, 2000. The surface to volume ratio is normally maximized in order to maximize the pumping speed and efficiency of the pills. High specific surface areas, on the order of about 0.3 sq m. per gram, can be achieved, for example, by grinding the raw SAES st707 particles into flakes and then pressing the flakes together to form a pill.

Standard st707 pellets have a specific surface area of roughly 0.3 square meters per gram. We would like our st707 getter material to have 0.03 to 0.00003 square meters per gram, preferably 0.03 to 0.0003, most preferably 0.03 square meters per gram. This material in powder form can be produced by using coarser sieves to extract the desired material from the metal being pulverized.

However, in the system of the present invention, the pill pumping speed requirements are practically negligible. Effectively, it is only necessary to pump down a roughly 100 liter volume in 24 hours. Thus a pumping speed in the order of $S=0.001$ to 0.01 liters per second is adequate in this system. This can be achieved by using getter material having a surface to volume ratio of only 1% to 10% of standard commercially available getter materials. For example, "raw" SAES st707 particles or pellets, which have not been treated to increase their surface area, have pumping speeds which are substantially lower than those which have been so treated. While the lower pumping speeds would be a disadvantage in many applications of such getters, in the present invention, the lower pumping speed is actually an advantage, because such slower speeds will substantially reduce water absorption each passivation cycle. Preferably a low pumping speed getter is utilized, which will absorb less than about 0.01 torr liters, more preferably less than about 0.005 torr liters of water vapor per gram of getter material during each passivation cycle.

Presently, one preferred getter material is SAES st707, available in pill form from SAES Getters USA, Colorado Springs Colo. More preferably SAES st707 material, which has a lower specific surface area and thus a lower absorption rate than standard SAES 707 pills, can be used. More particularly, the preferred getter material is made using coarser grain material so as to yield a getter material that has a surface area of about 0.005 to about 0.1 square meters per gram, more specifically about 0.01 to about 0.05 square meters per gram.

According to another aspect of the present invention, there is featured a flywheel energy storage system that includes a sealed housing; a flywheel assembly disposed within the sealed housing; a gas storage chamber disposed within the sealed housing; a first pump disposed within the sealed housing and operatively coupled to the gas storage chamber for pumping gases that evolve from the flywheel assembly and other portions of the flywheel system into the gas storage chamber, the evolved gases including water vapor and active gases; and, a plurality of pumps for simultaneously pumping substantially all of the gases pumped into the gas storage chamber, wherein the plurality of pumps includes at least one pump for pumping mainly the water vapor and at least one pump for pumping mainly the active gases. The flywheel energy storage system also includes a sealed container that is external to the sealed housing, but which is fluidly coupled to the gas storage chamber within the sealed housing. In this embodiment, the at least one pump for pumping mainly the water vapor is disposed within the gas storage chamber and the at least one pump for pumping mainly the active gases is disposed within the externally located sealed container.

In further embodiments, the pump for pumping mainly the water vapor is a water sorbent, and the pump for pumping mainly the active gases is a getter pump. Further, the water sorbent is preferably calcium oxide; and, the getter pump preferably includes non-evaporable getter (NEG) material. Also featured are methods related thereto.

Still further aspects and advantages will become apparent from a consideration of the ensuing description and drawings.

BRIEF DESCRIPTION OF THE DRAWINGS

The invention will be better understood by reference to the following more detailed description and accompanying drawings in which.

DETAILED DESCRIPTION OF THE INVENTION

Figure 2:
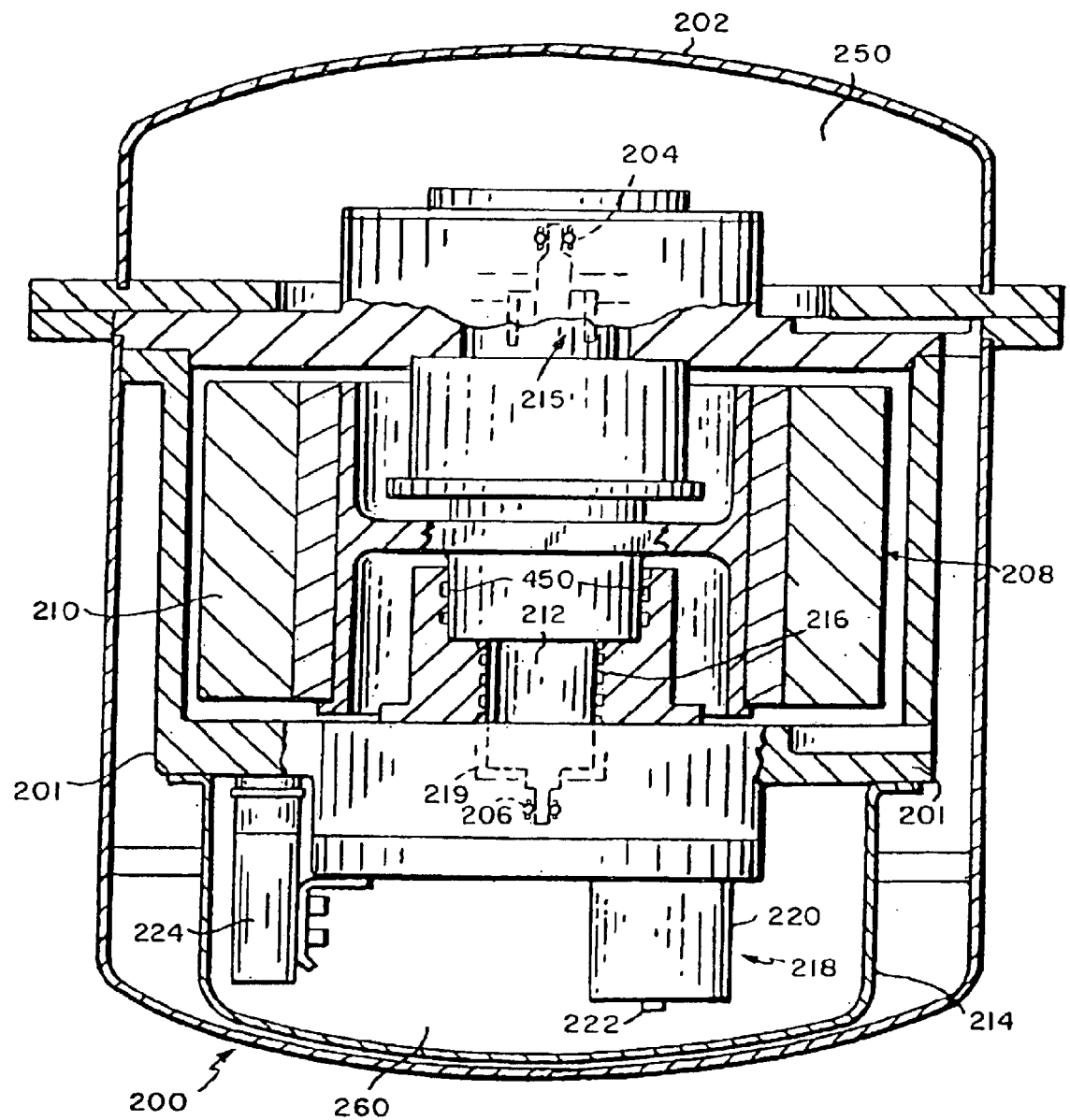
FIG. 2 is a cross-sectional view of a flywheel energy storage system in accordance with the present invention.

FIG. 2 shows a cross-sectional view of a flywheel energy storage system 200 in accordance with the present invention. The flywheel system 200 includes a main housing 202, which is suitably sealed to maintain gas pressure therein at or below a predetermined level for optimal performance of the flywheel energy storage system 200.

Operatively disposed in the main housing 202 is a flywheel assembly 208, which includes a shaft 212 coupled between upper and lower bearings 204 and 206. Further, a plurality of flywheel rotors 210, each typically about 12 inches in diameter, is coupled to the shaft 212. In a preferred embodiment, the predetermined gas pressure level maintained in a space 250 bounded by the main housing 202 is at near-vacuum, thereby minimizing drag on the flywheel rotors 210 and reducing windage losses during operation of the flywheel system 200.

The main housing 202 may be made of any suitable material, e.g., high strength steel. Similarly, the flywheel assembly 208 may be made of any suitable material. For example, the flywheel rotors 210 and the shaft 212 may also be made of high strength steel. Alternatively, the flywheel rotors 210 may be made of any suitable fiber composite materials, e.g., fiberglass, carbon fibers, boron fibers, or KEVLAR™ filament material (which is sold by and a trademark of the E. I. DuPont Co., Inc., Wilmington, Del., USA), etc. wound with a suitable resin binder.

It should be understood that the main housing 202 and the flywheel assembly 208 are conventional. Accordingly, specific structures used for implementing the main housing 202 and the flywheel assembly 208 are not critical to the present invention, and may take different forms.

In the illustrative embodiment shown in FIG. 2, the flywheel assembly 208 is disposed within the main housing 202, and supported by support member 201. A gas storage chamber 214 is sealingly coupled to the support member 201. As a result, another space 260 is defined by an inner surface of the gas storage chamber 214 and lower surfaces of the support members 201.

Further, a portion of the shaft 212 and the lower bearing 206 are positioned in that defined space 260, and space 260 is connected to space 250 through an orifice 219 formed through the support members 201. Preferably, the orifice 219 is formed as the terminus of the helical grooves of an integral drag pump, as further described below. A high-speed motor 215, which may have a maximum rotational speed of, e.g., about 8000 radians per second for driving the shaft 212 of the high-speed flywheel assembly 208, is disposed in the gas storage chamber 214. In the preferred embodiment, the gas pressure within space 260 in the gas storage chamber 214 is maintained at a level that is significantly higher than the near-vacuum gas pressure level in the space 250 surrounding the flywheel assembly 208 within the main housing 202.

Figure 1:
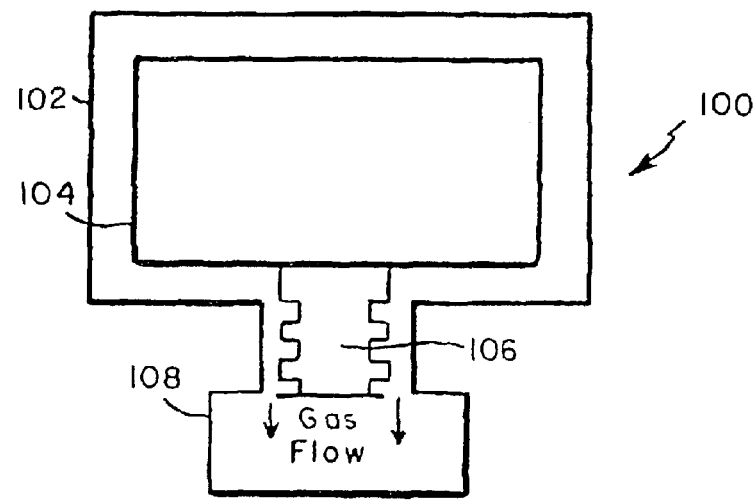
FIG. 1 is a simplified block diagram of a conventional flywheel energy storage system.
Figure 4:
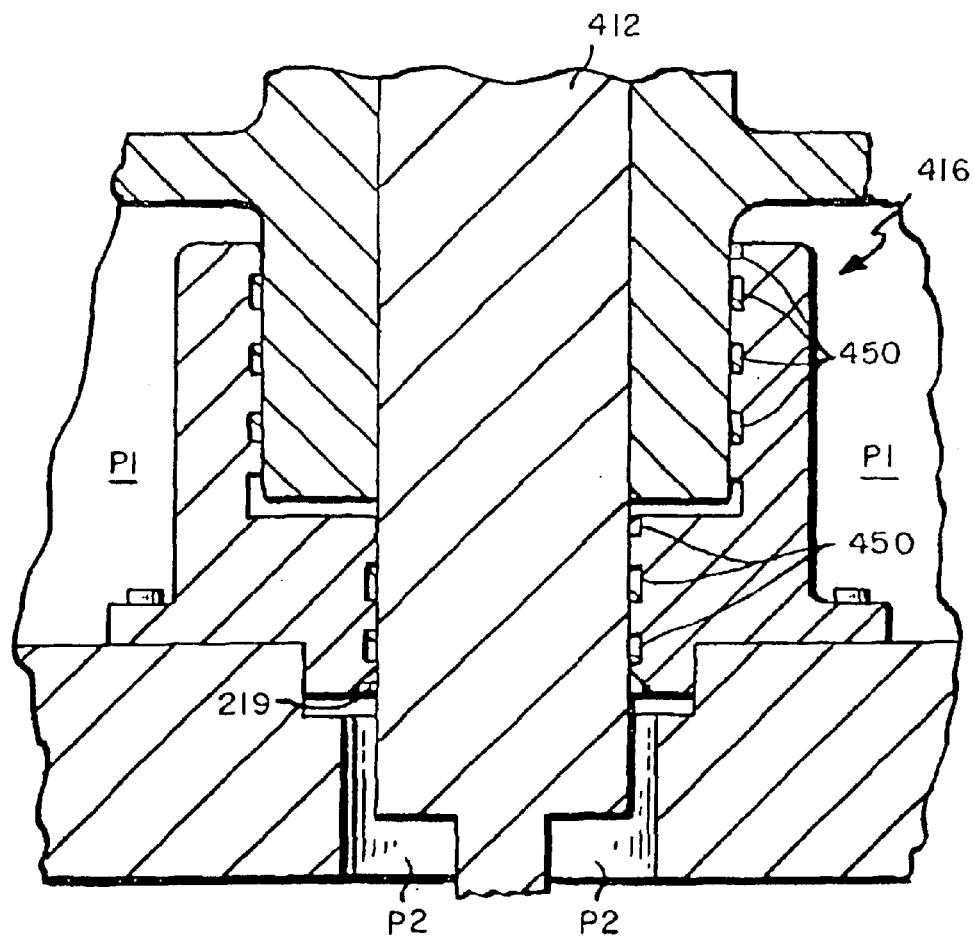
FIG. 4 is a detailed, cross-sectional view of a drag pump in accordance with the present invention, used with the flywheel energy storage system shown in FIG. 2.
Figure 5:
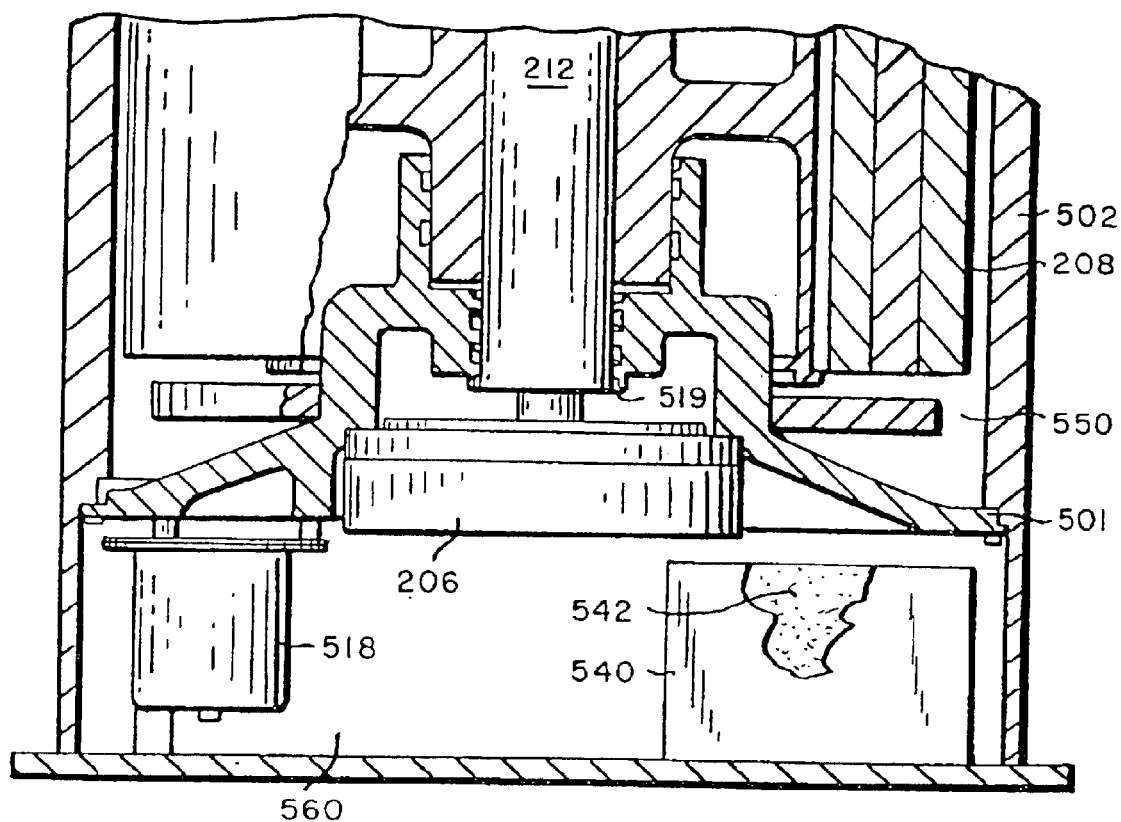
FIG. 5 is a detailed, cross-sectional view of a drag pump/getter pump arrangement in accordance with another embodiment of the present invention.

Specifically, the gas pressure within the gas storage chamber 214 is maintained at the significantly higher level by a drag pump 216, which may be implemented as, e.g., a conventional turbo-molecular pump or a conventional molecular drag pump. In the preferred embodiment, the drag pump 216 is integrated into the design of the flywheel assembly 208, as shown in FIGS. 2, 4 and 5. As a result, the high-speed motor 215, the shaft 212, and the upper and lower bearings 204 and 206 of the flywheel assembly 208 can be used to power the drag pump 216, thereby obviating the need for a separate motor to power the drag pump 216 and minimizing the overall cost of the flywheel system 200.

FIG. 4 shows a detailed, cross-sectional view of a drag pump 416, which corresponds with the drag pump 216 and is designed to be integrated with the flywheel assembly 208 of FIG. 2. Accordingly, a shaft 412, which corresponds with the shaft 212 of the flywheel assembly 208, is integrated with the structure of the drag pump 416 and provides the power required for operating the drag pump 416.

As mentioned above, the drag pump 416 maintains the gas pressure level within the gas storage chamber 214 at a level significantly higher than that within the main flywheel housing 202. Specifically, the drag pump 416 includes helical grooves 450 for providing a flow path for movement of gases from the main housing 202 to the gas storage chamber 214. As a result, the drag pump 416 operates to maintain an upstream pressure level, P1, in space 250 within the main housing 202, which is preferably near-vacuum; and, a downstream pressure level, P2, in space 260 within the gas storage chamber 214, wherein P2 is significantly greater than P1.

More specifically, the flywheel assembly 208, whether it is made of steel or fiber composite materials, evolves substantial quantities of gases during operation, thereby potentially increasing the upstream pressure, P1, in the main housing 202 to unacceptable levels if allowed to increase indefinitely. The other elements of the flywheel system 200 disposed in the main housing 202 can also evolve substantial quantities of gases, thereby contributing to the increased upstream pressure, P1. Such increased gas pressure levels in the main housing 202 can significantly reduce the lifetime of the flywheel system 200 because they generally lead to high windage losses. For this reason, the drag pump 416 pumps the evolved gases from the main housing 202 to the gas storage chamber 214, thereby decreasing the level of the upstream pressure, P1, and correspondingly increasing the level of the downstream pressure, P2.

Because the level of the downstream pressure, P2, also cannot be allowed to increase indefinitely, the flywheel system 200 further includes at least one pump disposed within the gas storage chamber 214. In the preferred embodiment, a getter pump 218 and a water sorbent 224 are disposed inside the gas storage chamber 214. The getter pump 218 and the water sorbent 224 are preferably arranged to operate in parallel inside the gas storage chamber 214, thereby permitting simultaneous absorbion of substantially all of the gases pumped from the enclosure of the main housing 202 to the gas storage chamber 214 by the drag pump 216, for ensuring that the downstream pressure, P2, is maintained at an acceptable level. The getter pump 218 and the water sorbent 224 also simultaneously absorb any gases that might evolve from the high-speed motor 215 and other portions of the flywheel system 200 disposed inside the gas storage chamber 214. The getter pump 218 also includes a pump housing 220, which may be made of any suitable material, e.g., aluminum. Further, the getter pump 218 preferably includes a centrally located, elongated, vented bolt 222, which serves as an inlet through which the evolved gases may flow from the gas storage chamber 214 into the getter pump 218.

For example, gases that evolve from the flywheel assembly 208 and the other portions of the flywheel system 200 may include water vapor, and various types of hydrocarbons and other active gases. Such gases commonly evolve from flywheel assemblies that are made using, e.g., fiber composite materials and operate at high-speeds. The parallel combination of the getter pump 218 and the water sorbent 224 provides a low-cost way of removing these different types of gases from the gas storage chamber 214, thereby preventing an unacceptable build-up of the downstream pressure, P2, inside the gas storage chamber 214. An important advantage of this illustrative embodiment of the present invention is that the parallel combination of the getter pump 218 and the water sorbent 224 absorbs not only water vapor, but also the hydrocarbons and other active gases that commonly evolve from high-speed flywheel energy storage systems.

It should be noted that, in general, neither the getter pump 218 nor the water sorbent 224 can absorb all of the gases in the ambient atmosphere. For example, the getter pump 218 and the water sorbent 224 generally cannot absorb inert gases, i.e., helium, neon, argon, krypton, xenon, and radon gases. For this reason, the structure of the main housing 202 preferably has a leak rate that is low enough for avoiding excessive permeation of the gases from the ambient atmosphere into the main housing 202 of the flywheel system 200.

Figure 3A:
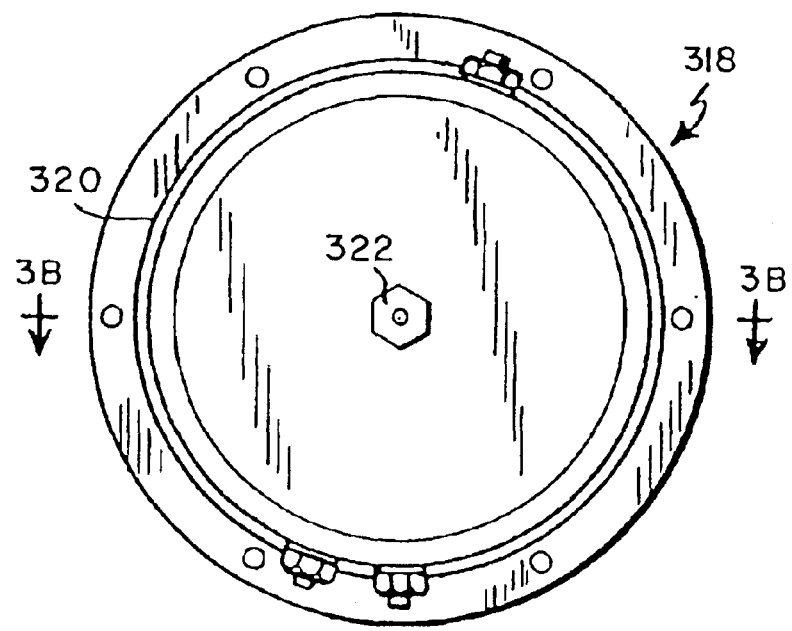
FIG. 3A is a bottom plan view of a getter pump in accordance with the present invention, used with the flywheel energy storage system shown in FIG. 2.

FIG. 3A shows a bottom plan view of one embodiment of a getter pump 318, which corresponds with the getter pump 218 and is designed to be operatively disposed inside the gas storage chamber 214 of the flywheel system 200, as shown in FIG. 2. The getter pump 318 includes a pump housing 320, which may be made of any suitable material, e.g., aluminum. Further, the getter pump 318 preferably includes a centrally located, elongated, vented bolt 322, which serves as an inlet through which the evolved gases may flow from the gas storage chamber 214 into the getter pump 318. For example, FIG. 2 shows that the corresponding getter pump 218 is coupled to a horizontal portion of the support member 201 for ensuring that the inlet provided by the elongated, vented bolt 322 is not obstructed.

Figure 3B:
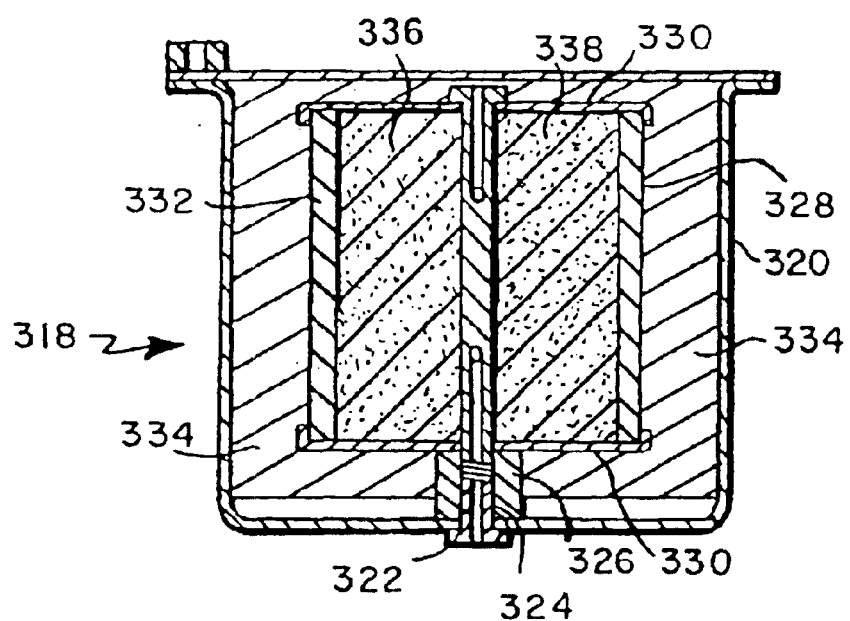
FIG. 3B is a cross-sectional view of the getter pump shown in FIG. 3A.

FIG. 3B shows a cross-sectional view of the getter pump 318 along the line 3—3. It should be noted that the elongated, vented bolt 322 of the getter pump 318 tends to constrict access to the interior of the getter pump 318, which preferably includes getter material 336 which is capable of absorbing substantially all of the active gases that evolve from the flywheel assembly 208 and other elements or portions of the flywheel system 200 during operation of the flywheel system. As noted above, the evolved gases may include both water vapor and usually lesser quantities of hydrocarbons and other active gases. If the vented bolt 322 were not provided for constricting access to the getter material 336 inside the getter pump 318, then the relatively high-cost getter material 336 would likely be quickly exhausted by absorbing mainly the water vapor, while allowing partial pressures of the hydrocarbons and other active gases to increase unchecked within the gas storage chamber 214.

In some embodiments, the inlet of the getter pump 318 is constricted, e.g., by using an elongated, vented bolt 322. One goal is to prevent the getter material 336 from becoming quickly exhausted by pumping mainly the evolved water vapor inside the gas storage chamber 214. In effect, a constricted inlet can be used to reduce the pumping speed of the getter pump 318. In order to compensate for the reduced pumping speed of the getter pump 318, the water sorbent 224 is preferably implemented using a material that can pump water vapor at a relatively fast rate. Water sorbents suitable for this purpose include relatively low-cost hydrous silicates such as Zeolite, calcium oxide and other known dessicants. Preferably the water sorbent is calcium oxide.

As a result, the faster pumping water sorbent 224, including, e.g., low-cost calcium oxide, absorbs most of the water vapor in the gas storage chamber 214, while the slower pumping, restricted, getter pump 318, including the relatively high-cost getter material 336, absorbs any remaining water vapor, hydrocarbons and/or other active gases inside the gas storage chamber 214. Because the getter pump 318 absorbs gases at a slower rate than the water sorbent 224, quick exhaustion of the relatively high-cost getter material 336 is avoided, thereby making the getter pump 318 inexpensive to use in the flywheel system 200.

Although the partial pressures of the water vapor, hydrocarbons, and other active gases tend to increase within the gas storage chamber 214, the overall gas pressure level within the gas storage chamber 214 will be acceptable so long as the respective pumping speeds of the getter pump 318 and the water sorbent 224 conform to the performance limits of the drag pump 216, which typically has a compression ratio of about 1000:1.

In the preferred embodiment, the getter material 336 used with the getter pump 318 of the present invention is non-evaporable getter (NEG) material, e.g., SAES™ st707 getter material, preferably in the form of pills, available from SAES Getters S.p.A., of Milan, Italy. SAES st707 is a combination of about 70% Zirconium, 24.6% Vanadium and 5.4% Iron, formed into particles having a desired particle size and surface area by grinding and sieving. For purposes of materials handling and safety, the particles thus produced can be compressed into pills, and used in the system in pill form.

Preferred getters for use in pumping active gases in accordance with the present invention include the above-mentioned SAES™ st707, as well as SAES™ st787, SAES™ st101, SAES™ st199 and SAES™ st198. A room temperature active gas getter which can be used in accordance with the present invention is the composition of barium and lithium having the formula $BaLi_4$, also available in "Combo Getters" from SAES S.p.A.

Alternately, SAES "Combo Getters" can be utilized in the present invention. A Combo Getter is a small cartridge containing $BaLi_4$ as an active gas sorbent. The $BaLi_4$ is protected from water vapor by blocking the inlet to the cartridge with macroscopic quantities of CaO dessicant. Thus water vapor tends to be pumped before it ever reaches the $BaLi_4$. While this approach can theoretically work as well as or better than the restricted aperture approach discussed above, it is not presently preferred for use with the present invention. The problem with this approach is that the Combo Getters are less flexible than the other approaches described above, and can be expensive if high capacity is required. Further, available Combo Getters cannot pump hydrocarbons.

In contrast with evaporable getters that can typically adsorb only limited amounts of gas molecules, NEGs can absorb substantial amounts of gas molecules by allowing the gas to diffuse directly into the bulk getter material. However, some NEG materials include a protective layer on their surfaces, which must first be removed either by thermal treatment or by activation at relatively high temperature to enable the surface to become clean and subsequently act as a gas scavenger. For this reason, the getter pump 318 includes the heater core 328, which houses the NEG material 336. Specifically, a pair of opposed heater core lids 330 ensure that the NEG material 336 is securely housed inside the heater core 328. Further, a standoff 326 is used for properly positioning the heater core 328 inside the getter pump 318 relative to the vented bolt 322. It should be noted that the heater core 328 includes an orifice (not numbered) through which the elongated, vented bolt 322 passes, thereby forming a passageway for the evolved gases to flow from the gas storage chamber 214, through the vented bolt 322, and into the heater core 328 for subsequent absorption by the heated NEG material 336.

The heater core 328 may be heated in any suitable manner. In the illustrative embodiment shown in FIG. 3B, the heater core 328 is first coated with a layer of ceramic material, e.g., CERAMABOND™ ceramic material. A single layer of, e.g., NiCr wire is then coiled around the layer of ceramic material, and respective ends of the NiCr wire are suitably bonded to two (2) lengths of insulated wire, which are fed through respective vented bolts secured to the getter pump housing 320. Next, the lengths of insulated wire are suitably connected to, e.g., a heater cartridge disposed within the gas storage chamber 214. The heater cartridge in combination with the lengths of insulated and NiCr wire and the layer of ceramic material therefore supplies heat to the heater core 328, which typically raises the temperature of the NEG material 336 disposed therein to at least 250° C., preferably about 300° C. in order to activate the NEG material 336.

Because high power consumption is generally unacceptable in flywheel energy storage systems, the amount of power required for heating the NEG material 336 inside the getter pump 318 is reduced by surrounding the heater core 328 with high grade insulation 334. Power requirements can be reduced from about 100 watts to about 5 or 10 watts, with the proper insulation. Reducing the power requirements increases the overall efficiency of the the flywheel energy storage system.

It should be noted that the getter pump 318 used with the flywheel energy storage system 200 must be capable of "self-starting" during a power-up sequence of the flywheel system 200. Specifically, pressure levels of evolved gases can be expected to increase within the main housing 202 of the flywheel system 200 during extended periods of non-use. Such gas pressure increases in the flywheel housing 202 typically exceed 0.01 Torr and in some extreme cases may reach levels approaching 100 Torr; and, the getter pump 318 must be able to "self-start" at power-up of the flywheel system 200 in this relatively high-pressure environment. This places strict requirements on the high grade insulation 334 used with the getter pump 318.

More specifically, the high grade insulation 334 used with the getter pump 318 preferably performs comparably with vacuum insulation. However, such vacuum insulation can normally be achieved only at pressure levels that are well under 0.01 Torr. As mentioned above, during extended periods of non-use, gas pressures within the main housing 202 of the flywheel system 200 can approach levels of 100 Torr in some extreme cases, thereby making it very difficult to achieve such vacuum insulation in the preferably "self-starting" getter pump 318 used with the flywheel system 200. Further, as mentioned above, the downstream pressure level, P2, within the gas storage chamber 214 enclosing the getter pump 318 is normally significantly greater than the upstream pressure level, P1, during operation of the flywheel system 200, thereby further contributing to the difficulty in achieving vacuum insulation in the getter pump 318.

For this reason, the high grade insulation 334 surrounding the heater core 328 in the getter pump 318 is preferably implemented using a material that provides as closely as possible the performance of vacuum insulation at elevated gas pressure levels ranging from about 0.01 Torr to about 100 Torr. Suitable materials for the high grade insulation 334 that provide such performance include, e.g., packed glass fiber such as conventional fiberglass insulation and preferably NANOPORE™ or XEROGEL™ insulation material, which takes is a semi-rigid insulating board available from Nanopore Inc., of Albaquerque, N.Mex.

Specifically, the high grade insulation 334 is preferably disposed between the inner surface of the pump housing 320 and the outer surfaces of the heater core 328 and the lower heater core lid 330. In order to have vacuum-like insulation, gas molecules between the inner surface of the pump housing 320 and the outer surfaces of the heater core elements 328 and 330 must generally traverse the gap between these inner and outer surfaces without colliding with each other. This means that the mean-free-path of the gas molecules must be equal to the distance between the above-described inner and outer surfaces. This is normally achievable only at gas pressure levels that are well under 0.01 Torr, preferably under 0.001 Torr.

However, when the high grade insulation 334 is implemented using, e.g., packed glass fiber or NANOPORE™ insulation material, the above-mentioned mean-free-path requirement can be achieved at the elevated gas pressure levels of about 0.01 Torr to about 1 Torr for glass fiber insulation, and of about 10 to 100 Torr for NANOPORE™ insulation material. This is because the packed glass fiber and the NANOPORE™ insulation material each have on the order of millions of tiny voids passing through the insulative material. Because gas molecules, on average, can traverse the tiny voids between the surfaces of the pump housing 320 and the heater core 328 by passing through these tiny voids without colliding with each other, the behavior of the gas molecules is vacuum-like and the high grade insulation 334 therefore provides vacuum-like insulation. Significantly, such vacuum-like behavior is achievable at the required elevated gas pressure levels ranging from about 0.01 Torr to about 100 Torr.

It should be noted that such vacuum-like behavior could be achieved at even higher gas pressure levels by decreasing the dimensions and increasing the number of the tiny voids in the high grade insulation 334. Because the NANOPORE™ insulation material typically has a greater number of voids that are smaller than those of the packed glass fiber, the high grade insulation 334 is implemented using the NANOPORE™ insulation material in the preferred embodiment of the present invention.

As described above, the elongated, vented bolt 322 of the getter pump 318 tends to constrict access to the getter material 336 inside the getter pump 318. Similarly, the high grade insulation 334 disposed between the surfaces of the pump housing 320 and the heater core elements 328 and 330 further tends to constrict access to the getter material 336. As explained above, such restricted access to the getter material 336 can cause the pumping speed of the getter pump 318 to be substantially reduced. This would normally be problematic in a flywheel energy storage system, wherein unacceptable increases of gas pressure in the vicinity of a flywheel assembly are to be avoided.

However, such reduced pumping speed of the getter pump 318 in the flywheel system 200 of the present invention is not problematic because the getter pump 318 is assisted by both the drag pump 216, which is disposed substantially inside the main housing 202, and the water sorbent 224, which is disposed inside the gas storage chamber 214.

For example, the drag pump 216 typically has a compression ratio of about 1000:1. This means that in order to maintain an acceptable vacuum pressure level of, e.g., 0.0001 Torr within the main housing 202 in the vicinity of the flywheel assembly 208, the drag pump 216 must pump the evolved gases from the main housing 202 to the gas storage chamber 214, thereby causing the gas pressure level within the gas storage chamber 214 to increase up to 1000 times the pressure level within the main housing 202, e.g., 0.1 Torr.

The drag pump 216 therefore provides the required pumping speed for removing the evolved gases and maintaining the acceptable vacuum pressure level of, e.g., 0.0001 Torr within the main housing 202. This means that the combined pumping speeds of the getter pump 318 and the water sorbent 224 need only be fast enough for maintaining the higher pressure level of, e.g., 0.1 Torr within the gas storage chamber 214. Another important advantage of this illustrative embodiment of the present invention is that the drag pump 216 reduces the pumping speed requirements of the getter pump 318 and the water sorbent 224, thereby making it possible to use low-cost, low-power implementations for the getter pump 318 and the water sorbent 224 in the flywheel system 200.

In addition, the pumping speed of the parallel combination of the getter pump 318 and the water sorbent 224 need only be sufficient for maintaining the higher pressure level of, e.g., 0.1 Torr inside the gas storage chamber 214. As described above, the constricted inlet of the getter pump 318 reduces the pumping speed of the getter pump 318, thereby reducing the speed at which the getter material 336 degrades inside the gas storage chamber 214. Still another important advantage of this illustrative embodiment of the present invention is that the relatively expensive getter material 336 inside the getter pump 318 degrades over a relatively long period of time, thereby reducing the cost of using such getter material in flywheel energy storage systems.

Further, the water sorbent 224 is preferably capable of maintaining a relatively fast pumping speed for pumping water vapor, which typically constitutes most of the evolved gases inside the flywheel system 200. Even though the getter pump 318 disposed inside the gas storage chamber 214 has a reduced pumping speed, the pressures of the evolved gases pumped into the gas storage chamber 214 by the drag pump 212 do not reach unacceptable levels because the water sorbent 224 pumps in parallel with the getter pump 318 and at a faster rate than the getter pump 318, thereby absorbing most of the water vapor inside the gas storage chamber 214 and obviating the need for the getter pump 318 to absorb substantial quantities of water vapor.

The actual values of the respective pumping speeds for the getter pump 318 and the water sorbent 224, which preferably conform to the performance limits of the drag pump 216, can be empirically determined by one skilled in this art. It should be noted that the empirical determination of the pumping speed for the getter pump 318 would generally include determinations of the size of the constricted inlet, the amount and type of getter material 336 inside the heater core 328, and the amount and type of high grade insulation 334 surrounding the heater core 328. It should also be noted that the empirical determination of the pumping speed for the water sorbent 224 may include a determination of the optimal distribution of the water sorbent 224 throughout the gas storage chamber 214, thereby optimally exposing the water sorbent 224 to the evolved water vapor inside the gas storage chamber 214.

In the illustrative embodiment shown in FIG. 5, the flywheel assembly 208 is disposed in space 550 within the main housing 502, and supported by support member 501. A gas storage chamber is formed beneath support member 501. As a result, another space 560 is defined by the inner surface of the housing 502, the lower surfaces of the support member 501, and the base plate 503.

Further, a portion of the shaft 212 and the lower bearing 206 are positioned in that defined space 560, and space 560 is connected to space 550 through an orifice 519 formed through the support members 501. Preferably, the orifice 519 is formed as the terminus of the helical grooves of an integral drag pump, as described above. As in the previously described embodiment, the gas pressure within space 560 is maintained at a level that is significantly higher than the near-vacuum gas pressure level in the space 550 surrounding the flywheel assembly 208 within the main housing 502.

Figure 6:
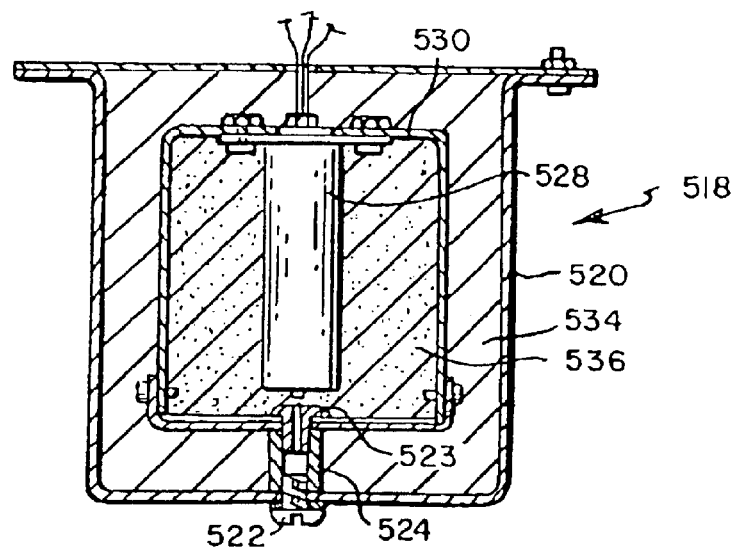
FIG. 6 is a cross sectional view of an alternative pill pump used in connection with the embodiment of FIG. 5.

FIG. 6 depicts an alternative form 518 of getter pump 318, compared to that depicted in FIG. 3B. In this case, a container 520 such as a metal can be used to hold the NEG material 536, with a two to three inch long ½ to ¼ inch diameter cartridge heater 528 running axially through the center of the can to provide the necessary heat. A preferred cartridge heater ia the Mighty Watt heater, available from Ogden Manufacturing Co. of Arlington Heights Ill., having a rated load of 23 watts.

Getter pump 518 preferably includes a getter material 536 which is capable of absorbing substantially all of the active gases that evolve during operation of the flywheel system. As noted above, the evolved gases may include both water vapor and usually lesser quantities of hydrocarbons and other active gases. As in the case of the FIG. 3B embodiment, access to the getter pump is preferably constricted, to help prevent early exhaustion of the relatively high-cost getter material 536 by absorbing mainly the water vapor, while allowing partial pressures of the hydrocarbons and other active gases to increase unchecked within the gas storage area 560.

In the depicted embodiment, the inlet of the getter pump 318 is constricted, e.g., by using a pair of vented bolts 522 and 523. Those bolts attach the holder 530 for the getter material to the container 520 through a ceramic cylindrical plug 524. The plug provides space for suitable insulating material.

One goal is to prevent the getter material 536 from becoming quickly exhausted by pumping mainly the evolved water vapor inside the gas storage area 560. In effect, a constricted inlet can be used to reduce the pumping speed of the getter pump 518. In order to compensate for the reduced pumping speed of the getter pump 518, the water sorbent is preferably implemented using a material that can pump water vapor at a relatively fast rate.

As in the case of the embodiment of FIG. 3B, the getter pump 518 is preferably highly insulated by an efficient insulating material 534, such as the Nanopore material previously described.

FIG. 5 also depicts a container 540, for holding the water absorber 542. Preferably the container 540 is made of wire mesh, or similarly open structure, so that the water vapor in the space has easy acces to the water absorber. Preferably Calcium Oxide is used as the water absorber, and the container 540 is structured to contain the absorber so that it does not spread over the inside of the space 560. Most preferably, the water absorber is contained in porous packets, such as packets made of Tyvek material, obtainable from DuPont. For example, commercially available tyvek packets of CaO such as those sold under the name Mini-Pax™ as sold by Multisorb Technologies are particularly suitable for use in the present invention.

Figure 7:
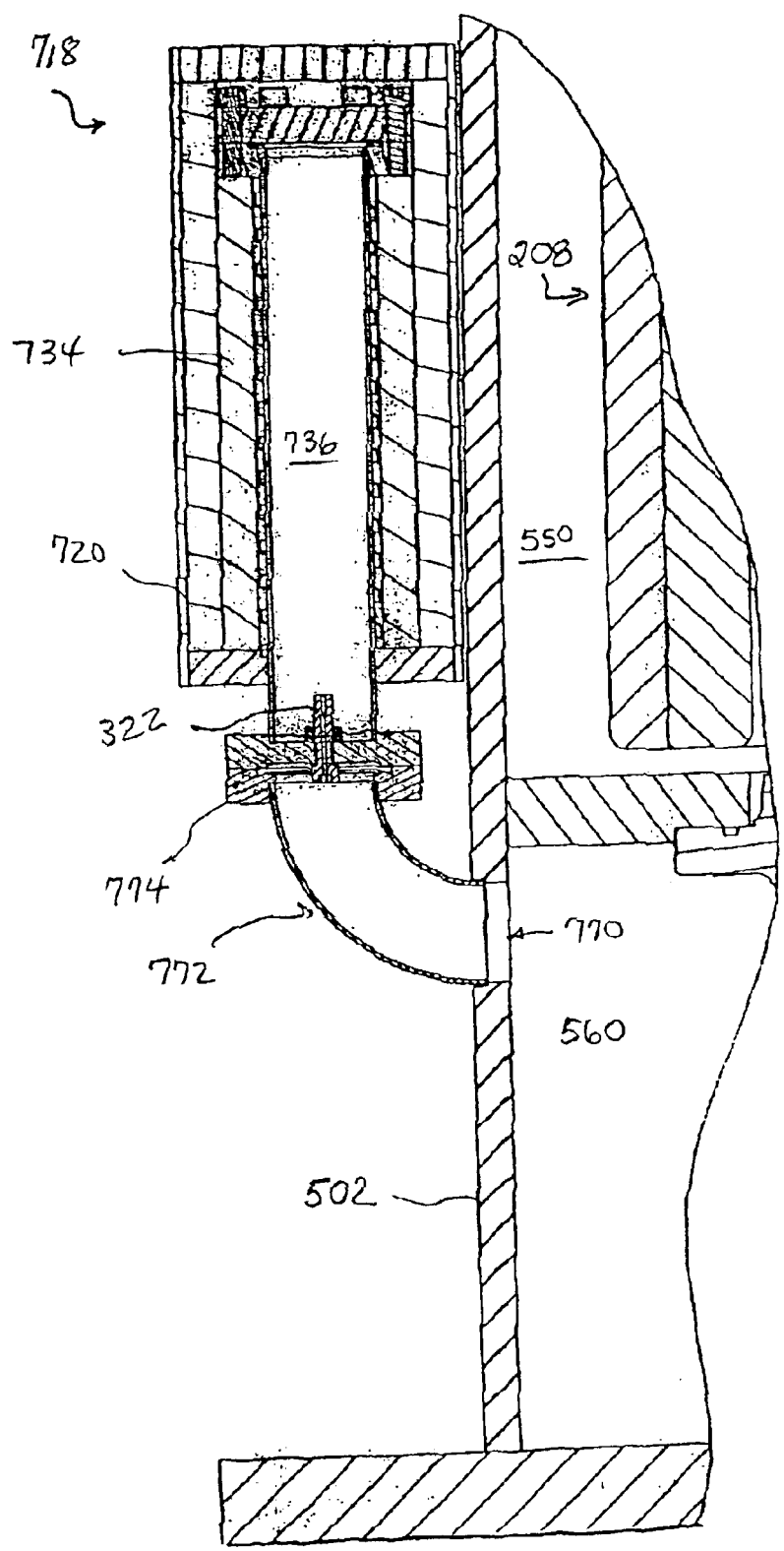
FIG. 7 is a cross-sectional view of getter pump arrangement according to yet another embodiment of the present invention, where the getter pump is external to the sealed housing of the flywheel energy storage system.

Referring now to FIG. 7, there is shown a cross-sectional view of getter pump arrangement according to yet another embodiment of the present invention. Reference shall be made to the discussion of FIGS. 2–5 herein for details of common elements shown on FIG. 7. Although not shown in FIG. 7, as shown in FIG. 5, a container 540 for holding the water absorber is disposed within the space 560. As in the previously described embodiments of the present invention, the gas pressure within the space 560 is maintained at a level that is significantly higher than the near-vacuum gas pressure level in the space 550 surrounding the flywheel assembly 208 within the main housing 502.

In the illustrated embodiment, the getter pump 718 is disposed so as to be external to the sealed or main housing 502 but is fluidly coupled to the gas space 560. In this embodiment, the getter pump 718 is fluidly coupled to the space 560 by interconnecting piping 772 that is connected to a main housing aperture 770. The aperture 770 is provided in the main housing 502 and is formed so as to be in fluid communication with the gas space 560. In an exemplary embodiment, an end of the interconnecting piping 772 is secured to the main housing 502 using any of a number of techniques known to those skilled in the art, such as for example, welding so as to form a pressure boundary.

The other end of the interconnecting piping 772 is configured and arranged so as to fluidly couple the getter pump container 720 thereto. In an exemplary illustrative embodiment, the getter pump container 720 is configured with a flanged nozzle and the other end of the interconnecting piping also is configured with a mating flange so the flanged ends can be secured together so as to form a flanged connection 774.

Getter pump 718 preferably includes a getter material 736 which is capable of absorbing substantially all of the active gases that evolve during operation of the flywheel system. As noted above, the evolved gases may include both water vapor and usually lesser quantities of hydrocarbons and other active gases. As in the case of the FIGS. 3B and 5 embodiments, access to the getter pump is preferably constricted, to help prevent early exhaustion of the relatively high-cost getter material 736 by absorbing mainly the water vapor, while allowing partial pressures of the hydrocarbons and other active gases to increase unchecked within the gas storage area 560.

In the depicted embodiments, the flanged nozzle of the getter pump container 720 is configured with a through aperture in which is received an elongated, vented bolt 322 or the like. In this way, the elongated, vented bolt 322 or the like thereby constricts the inlet of the getter pump 718. As indicated herein, to prevent the getter material 736 from becoming quickly exhausted by pumping mainly the evolved water vapor inside the gas storage area 560 a constricted inlet is used to reduce the pumping speed of the getter pump 718. In order to compensate for the reduced pumping speed of the getter pump 718, the water sorbent is preferably implemented using a material that can pump water vapor at a relatively fast rate.

As in the case of the embodiment of FIG. 3B, the getter pump 718 of this embodiment is preferably highly insulated by an efficient insulating material 534, such as the Nanopore material previously described. In addition and as also described herein, the getter pump 718 is configured so as to further include a mechanism for heating the getter material 736.

Figure 8:
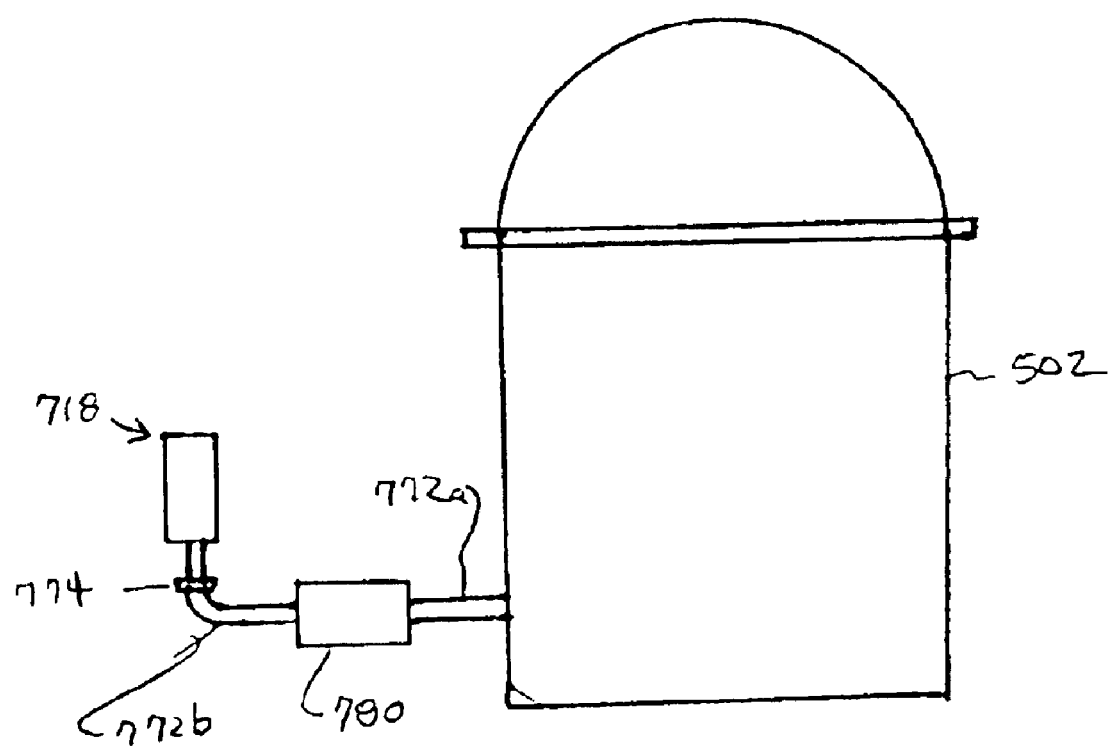
FIG. 8 is a schematic view illustrating an alternative external getter pump arrangement according to the present invention.

Referring now to FIG. 8 there is shown a schematic view illustrating an alternative external getter pump arrangement according to the present invention. In this embodiment, the getter pump 718 is fluidly coupled to the space 560 within the main housing 502 as with the embodiment illustrated in FIG. 7 by interconnecting piping 772a,b and a valve mechanism 780. In this embodiment, the valve mechanism 780 is any of a number of valve mechanisms known to those skilled in the art for selectively isolating the getter pump 718 from the gas space 560.

According to this embodiment, the user actuates and closes the valve mechanism 780 so as to fluidly isolate the getter pump from the gas space 560. Thereafter, the presently installed getter pump 718 can be removed and replaced by another a getter pump 718 for example, after it is determined that the getter material of the presently installed getter pump is used up or has limited capability to further absorb the active gases, without breaking or upsetting the sub-atmospheric conditions within the main housing 502. Thereafter, the user would evacuate the air from within the interconnecting piping 772b and the replacement getter pump 718 and after establishing the desired gas pressure conditions would open the valve mechanism 780 so as to re-establish a fluid connection between the gas space 560 and the getter pump 718 and the getter material 736 thereof.

Having described some embodiments, numerous alternative embodiments or variations of the present invention might be made. For example, particular dimensions of the flywheel rotors, operational speeds of the high-speed motor, and compression ratios of the drag pump were described. However, these were merely illustrative examples and other useful dimensions/speeds/compression ratios for the flywheel energy storage system are possible. It should be noted, however, that the present invention, which includes the parallel combination of the getter pump and the water sorbent disposed inside the gas storage chamber, is especially beneficial when used with high-speed flywheel systems that incorporate flywheel rotors made of fiber composite materials and drag pumps capable of providing vacuum pumping in the vicinity of the flywheel rotors.

In addition, it was described that the drag pump of the present invention is preferably integrated into the design of the flywheel assembly including the upper and lower bearings, the shaft, and the high-speed motor, thereby obviating the need for providing a separate motor to drive the drag pump. However, this was also merely meant to be an illustrative example. It should be noted that important advantages of the present invention can still be achieved even if the drag pump were implemented as a self-contained, modular drag pump.

In addition, it was described that the parallel arrangement of the getter pump and the water sorbent is designed to be operatively disposed within the gas storage chamber of the flywheel energy storage system. However, this was also merely meant to be an illustrative example. Alternative embodiments of the present invention might omit the specific structure of the disclosed getter pump entirely, and merely provide suitable quantities of getter material and water sorbent inside the separate gas storage chamber for simultaneously pumping the evolved water vapor, hydrocarbons, and/or other active gases in the flywheel system.

In addition, particular NEG and insulative materials were described for use with the getter pump of the present invention. However, these were also merely illustrative examples and other materials may be similarly used with the getter pump. But, it should be noted that preferred NEG materials are those that can effectively absorb all of the gases that evolve from high-speed flywheel systems. Further, preferred insulative materials are those that provide void sizes on the order of the mean-free-path of the gas molecules in the walls of the getter pump, thereby providing vacuum-like insulation at elevated gas pressure levels.

In addition, a parallel combination of a getter pump and water sorbent was described for use with a flywheel energy storage system. However, this was merely an illustrative example. The getter pump and the water sorbent arranged in parallel might alternatively be used in other applications such as vacuum insulated panels for, e.g., commercial or home refrigeration units.

Further, instead of being arranged in parallel, the getter pump and the water sorbent of the present invention might alternatively be arranged in series. For example, a serial combination of the getter pump and the water sorbent might be disposed in a single housing such that gases pass through the water sorbent first for pumping water vapor, and then to the getter material for pumping any remaining water vapor, hydrocarbons, and/or other active gases. In this alternative configuration, it is important that the relatively low-cost water sorbent prevents most of the water vapor from reaching the relatively high-cost getter material.

Further, instead of merely constricting the inlet of the getter pump for preventing the getter material disposed therein from becoming quickly exhausted by pumping mainly the evolved water vapor inside the gas storage chamber, power may alternatively be intermittently or periodically provided to the heater cartridge for heating the heater core of the getter pump, thereby activating the NEG material disposed therein. In this way, the NEG material disposed inside the heater core may be intermittently or periodically activated (i.e., the getter pump would be "turned-on") at times when, e.g., the partial pressures of the hydrocarbons and other active gases in the gas storage chamber approach unacceptable levels.

Whether or not the inlet of the getter pump 318 is constricted as described above, the use of NEG or equivalent getter material, and the intermittent heating thereof, is the preferred method for preventing quick exhaustion of the getter material 336 due to the absorption of mainly water vapor inside the gas storage chamber 214.

In addition, the bulk NEG material is generally described has having very high surface to volume ratio. Although the intermittent activation of the pill pump is effective to reduce water sorption by the pills, a portion of the capacity of the NEG material is somewhat reduced by water passivation during the cool-down of the pill pump. Alternatively, and according to another aspect of the present invention, the bulk NEG material is ground so as to have an optimum surface to volume ratio so as to improve the intermittent activation of the pill pump.

Since water is the dominant gas load in the system, each time the pill pump is turned off it is coated (passivated) primarily by water. A one gram pill of st707 will absorb up to 0.07 torr liters of water, or about 0.4% of it's capacity, each time it is cycled. Thus each time the pill is passivated, there is a loss of 0.4% of the pills capacity to pump a non-water active gas.

This lost getter capacity can be substantially reduced by adjusting the surface to volume ratio of the pills. NEG materials sold for vacuum applications, such as SAES st707 pills, are normally produced intentionally with very high surface to volume ratios. See, e.g., U.S. Pat. No. 6,027,986, issued to Conte, et al., on Feb. 22, 2000. The surface to volume ratio is normally maximized in order to maximize the pumping speed and efficiency of the pills. High specific surface areas, on the order of about 0.3 sq m. per gram, can be achieved, for example, by grinding the raw SAES st707 particles into flakes and then pressing the flakes together to form a pill.

In the presently described intermittent activation approach, the getter pumping speed requirements are very low. The need is to pump down a roughly 100 liter volume in 24 hours. This means a pumping speed of the order of S=0.01 liters per second is needed for such a result. Such a pumping speed can be achieved using coarser grain st707 material with reduced specific surface area. In more particular embodiments, the st707 material has a specific surface area of about 0.03 to 0.00003 square meters per gram, preferably 0.03 to 0.0003 square meters per gram, most preferably 0.03 square meters per gram. Such material in powder form can be produced by using coarser sieves to extract the desired material form the metal being pulverized. In an exemplary embodiment, using st707 material with a specific surface area of 0.03 square meters per gram, the getter pump would absorb about 0.007 torr liters of water at each passivation cycle. This advantageously reduces the wasted NEG capacity to about 0.04% in absorbing water vapor each time the getter pump is shut down.

It should be understood that the getter pump and the water sorbent are arranged in parallel inside the gas storage chamber. Thus, even though the getter pump may be turned-on only when the partial pressures of the hydrocarbons and other active gases intermittently or periodically approach unacceptable levels, the water sorbent continuously pumps the evolved water vapor inside the gas storage chamber. As a result, the getter pump absorbs a reduced amount of water vapor because most of the water vapor would be absorbed by the relatively low-cost water sorbent. This alternative embodiment of the getter pump is particularly useful when the getter pump is assisted by both the drag pump and the water sorbent, and when a significant amount of time is required for the active gas loads to reach unacceptable levels.

Further, in alternative embodiments wherein the getter pump is implemented using unheated getter material, e.g., unheated $BaLi_4$ used in combo getter cartridges, the getter pump might similarly be "turned-on" by, e.g., intermittently or periodically opening a valve. It should be understood that these alternative embodiments of the getter pump are not meant to be limiting, and other structures for intermittently or periodically "turning-on" the getter pump are possible.

In practice, it has been found that the time periods between successive activations can be far longer than expected, based on the properties of the materials involved, and the conditions of use. While not wishing to be bound by theory, it is believed that the necessity for frequent activation is substantially reduced because the getter materials continue to pump hydrogen even after they are passivated by gases from within the flywheel system. Since hydrogen is the dominant active gas generated in the system, other than water vapor, the system can be run far longer than anticipated before pressures build to the point justifying an activation cycle. The benefits from this phenomenon, along with the benefits of the present parallel pumping system, lead to a highly effective and efficient system for maintaining vacuum.

The present invention has been described in detail including the preferred embodiments thereof. However, it should be appreciated that those skilled in the art, upon consideration of the present disclosure, may make modifications and/or improvements on this invention and still be within the scope and spirit of this invention as set forth in the following claims.

What is claimed is:

1. A flywheel energy storage system, comprising:
   a sealed housing;
   a flywheel assembly disposed within the sealed housing;
   a gas storage chamber disposed within the sealed housing;
   a sealed container external to the sealed housing and fluidly coupled to the gas storage chamber;
   a first pump disposed within the sealed housing and operatively coupled to the gas storage chamber for pumping gases that evolve from the flywheel assembly into the gas storage chamber, the evolved gases including water vapor and active gases;
   a plurality of pumps for simultaneously pumping substantially all of the gases pumped into the gas storage chamber, wherein said plurality of pumps includes at least one pump for pumping mainly the water vapor and at least one pump for pumping mainly the active gases;
   wherein said at least one pump for pumping mainly the water vapor is disposed in the gas storage chamber; and
   wherein said at least one pump for pumping mainly the active gases is disposed in the external container.

2. The flywheel energy storage system as recited in claim 1, wherein the pump for pumping mainly the water vapor is a water sorbent, and the pump for pumping mainly the active gases is a getter pump.

3. The flywheel energy storage system as recited in claim 2, wherein said getter pump includes a getter housing with a constricted inlet, and getter material that is disposed within the getter housing.

4. The flywheel energy storage system as recited in claim 3, wherein the getter pump further includes a getter material storage chamber disposed within the getter housing, the getter material being disposed within the getter material storage chamber and in fluid communication with the constricted inlet.

5. The flywheel energy storage system as recited in claim 4, wherein the getter pump further includes a heater unit operatively coupled to the getter material storage chamber for heating the getter material.

6. The flywheel energy storage system as recited in claim 3, wherein the getter material is non-evaporable getter material.

7. The flywheel energy storage system as recited in claim 4, wherein the getter pump further includes a void between the getter housing and the getter material storage chamber disposed therein, and an insulative material substantially fills the void.

8. The flywheel energy storage system as recited in claim 7, wherein the insulative material is selected from the group consisting of packed glass fiber and a semi-rigid insulating board.

9. The flywheel energy storage system as recited in claim 2, wherein the water sorbent is selected from the group consisting of Zeolite and calcium oxide.

10. A method of reducing gas pressure within a flywheel housing, the method being used for reducing windage losses caused by gases evolving from a flywheel assembly disposed within the flywheel housing, the evolved gases including water vapor and active gases, comprising the steps of:
   (a) pumping the evolved gases from the flywheel housing to a chamber separate from the flywheel housing; and
   (b) pumping substantially all of the gases pumped into the separate chamber using a plurality of pumps, wherein the plurality of pumps including at least one pump for pumping mainly the water vapor that is disposed within the separate chamber and at least one pump for pumping mainly the active gases which said at least one pump is disposed in a container external to the flywheel housing and fluidly coupled to the separate chamber.

11. The method of reducing gas pressure within a flywheel housing as recited in claim 10, wherein the pumping in step (a) is performed by a drag pump.

12. The method of reducing gas pressure within a flywheel housing as recited in claim 10, wherein the pumping in step (b) is performed by at least one water sorbent for pumping mainly the water vapor and at least one getter pump for pumping mainly the active gases.

13. The method of reducing gas pressure within a flywheel housing as recited in claim 10, wherein the pumping in step (a) reduces the gas pressure within the flywheel housing to a near-vacuum level while increasing gas pressure within the separate chamber to a level substantially greater than the near-vacuum level.

14. An apparatus for simultaneously pumping a plurality of different types of gases including water vapor and active gases, comprising:
- a water sorbent; and
- a getter pump, wherein the getter pump includes:
- a getter housing having a constricted inlet, and
- a getter material storage chamber disposed within the getter housing;
- getter material; disposed within the getter material storage chamber so as to be in fluid communication with the constricted inlet;
- wherein the getter material is a non-evaporable getter material being composed so as to have a surface to volume ratio that yields a pumping speed in the range of from 0.001 to 0.01 liters per second.

15. The pumping apparatus as recited in claim 14, further including a heater unit operatively connected to the getter material storage chamber for heating the getter material and wherein the getter material is composed so the getter material absorbs less than about 0.01 torr liters of water vapor per gram during each passivation cycle.

16. The pumping apparatus as recited in claim 14, wherein the getter material is composed so as to have a surface area of one of in the range of about 0.005 to about 0.1 square meters per gram or in the range of about 0.01 to about 0.05 square meters per gram.

17. The pumping apparatus as recited in claim 16, wherein the getter material has a nominal formulation of Zirconium, Vanadium and Iron.

18. The pumping apparatus as recited in claim 14, wherein the getter material is composed so as to have a surface area of one of in the range of about 0.03 to about 0.00003 square meters per gram, in the range of about 0.03 to about 0.0003 square meters per gram or 0.03 square meters per gram.

19. A method of reducing gas pressure within a flywheel housing, the method being used for reducing windage losses caused by gases evolving from a flywheel assembly disposed within the flywheel housing, the evolved gases including water vapor and active gases, comprising the steps of:
- (a) pumping the evolved gases from the flywheel housing to a chamber separate from the flywheel housing;
- (b) continuously pumping the water vapor using at least one first pump disposed in the separate chamber; and
- (c) intermittently pumping the active gases using at least one second pump disposed in a container external to the flywheel housing and the separate chamber but fluidly coupled to the separate chamber, the at least one second pump intermittently pumping the active gases at times when associated active gas loads approach predetermined levels.

* * * * *